United States Patent
Pietraniec (10) Patent No.: US 9,179,256 B1
(45) Date of Patent: Nov. 3, 2015

(54) CONTEXT-BASED ALERT DELIVERY

(75) Inventor: Nicholas A. Pietraniec, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 416 days.

(21) Appl. No.: 13/296,480

(22) Filed: Nov. 15, 2011

(51) Int. Cl.
*H04W 24/00* (2009.01)
*H04W 4/02* (2009.01)

(52) U.S. Cl.
CPC ................. *H04W 4/021* (2013.01)

(58) Field of Classification Search
CPC .............................. H04W 4/021; H04W 4/025
USPC ............. 455/404.1, 404.2, 456.1–457, 414.1, 455/414.2; 340/539.13, 988–996; D10/104.2; 705/14.4–14.73; 725/42; 719/318
See application file for complete search history.

(56) References Cited

U.S. PATENT DOCUMENTS

| | | | |
|---|---|---|---|
| 7,696,868 B1 * | 4/2010 | Emigh | 340/539.13 |
| 8,194,581 B1 * | 6/2012 | Schroeder et al. | 370/313 |
| 2004/0002958 A1 * | 1/2004 | Seshadri et al. | 707/3 |
| 2007/0180123 A1 * | 8/2007 | Bennett | 709/227 |
| 2009/0049151 A1 * | 2/2009 | Pagan | 709/207 |
| 2012/0052879 A1 * | 3/2012 | Wildon et al. | 455/456.1 |
| 2012/0054001 A1 * | 3/2012 | Zivkovic et al. | 705/14.1 |
| 2012/0276928 A1 * | 11/2012 | Shutter | 455/456.3 |

* cited by examiner

*Primary Examiner* — Ronald Eisner
(74) *Attorney, Agent, or Firm* — Hogan Lovells US LLP (57) ABSTRACT

A user can be notified of certain events or occurrences according to time and location information specified by the user. In some embodiments, a user can specify a location such as an office or warehouse, and can select an automatic range such that whenever the user is within the automatic range of that location, notifications are automatically delivered to the user. The user can also specify a management range, such that when the user is outside the automatic range but inside the management range the user will not receive the notification unless the notification has been pending for a specified delay period. Such an approach enables notifications to be delivered when the notifications are most relevant. If the maximum delay has passed or the user is outside the management range, the notification can be automatically delivered to the user or another user can be selected to receive the notification.

26 Claims, 7 Drawing Sheets

CONTEXT-BASED ALERT DELIVERY

BACKGROUND

People are increasingly relying on electronic devices for a variety of different purposes. For example, merchants can rely on email messages or pager notifications when an item is sold that needs to be prepared for shipping. While such notifications are beneficial in many situations, the merchant typically has little control over when or where the notifications are received. For example, the merchant might not want to receive notifications while at home or otherwise away from the office. While the merchant has the option of turning off the device configured to receive the notifications, such an approach can be undesirable in at least some situations because the merchant might miss emergency messages or other important notifications, or at least might not be able to utilize the device for other purposes during those times.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to providing notifications for various events or occurrences. In particular, a time- and location-based approach can be used to manage notification deliveries to a user, such that the user can receive notifications at the times and locations when those notifications are most relevant and/or least intrusive for the user.

In some embodiments, a user can specify a location that will be used to determine when and where to deliver notifications. In many instances, this location can correspond to a facility (e.g., an office or warehouse) where the user can act upon the notification. For example, if the user is associated with a merchant and is in charge of shipping items that are ordered, the user (or merchant, etc.) might specify the location to correspond to the address or coordinates of a warehouse from which the items will be shipped. In some cases, multiple locations can be specified. For each location, the user can specify at least one distance or other range-determining metric to use in managing notification delivery. For example, a user can specify an automatic notification range or region where, when the user (or a device associated with a user) is determined to be within that region, a notification for at least certain types of events can automatically be delivered to the user.

In some embodiments, a user can also specify a second range or region, such as a notification management region. When the user (or device) is determined to be within the notification management region, but outside the automatic notification region, the notifications can be held until such time as the user re-enters the automatic notification region. At least one time period, maximum delivery delay value, or other such time limit can also be specified such that, if a notification is not delivered for at least that amount of time, another notification approach can be taken such that the necessary action corresponding to the notification does not get postponed beyond a certain amount of time. In some embodiments the notification can be delivered to another user within the automatic notification range, or meeting some other such criterion, when the original user does not receive and/or acknowledge receipt of the notification within the specified time limit.

In some embodiments, notifications can also be managed differently when the user is outside the notification management range. For example, a user might be hundreds of miles away and unable to get to the designated location within a reasonable amount of time. In such an instance, the notification might get automatically delivered to the user in order to enable the user to instruct someone else to handle the action. In other embodiments, a notification management service might attempt to deliver the notification to another user who is within at least the notification management range. These and other such actions can be configurable by the user or another such party.

Various other applications, processes and uses are presented below with respect to the various embodiments.

Figure 1:
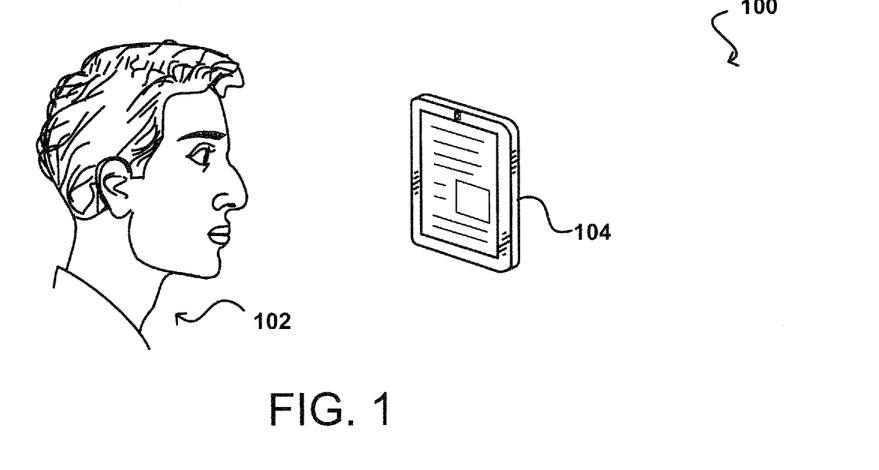
FIG. 1 illustrates an environment in which a user can utilize an electronic device to attempt to obtain information in accordance with various embodiments.

FIG. 1 illustrates an example situation 100 wherein a user 102 is able to view, hear, or otherwise receive content presented to the user via an electronic device 104. For example, content might be displayed on a display element (e.g., an LCD screen) of the electronic device, or a light (e.g., LED) might flash or illuminate to indicate the presence of a notification. In some embodiments, an audible notification might be generated by the device, such as an audible tone, ring tone, or computer-generated speech. In at least some embodiments a user can configure the form in which the notifications are delivered, while in at least some embodiments the type of notification can be determined based upon factors such as location, time of day, day of the week, detected user action, or any other such information.

In addition to the user being able to adjust the type of notification that the user receives, approaches in accordance with various embodiments also enable a user (or other appropriate entity) to configure the times and/or places at which the user receives those notifications. For example, a user might not want to hear an audible notification or see a flashing notification if the user is at home or at least a minimum distance away from the office. The user might prefer to set a region where the user is to receive notifications based at least in part upon the ability of the user to act on that notification, such as where the notification is most relevant to the user.

Figure 2:
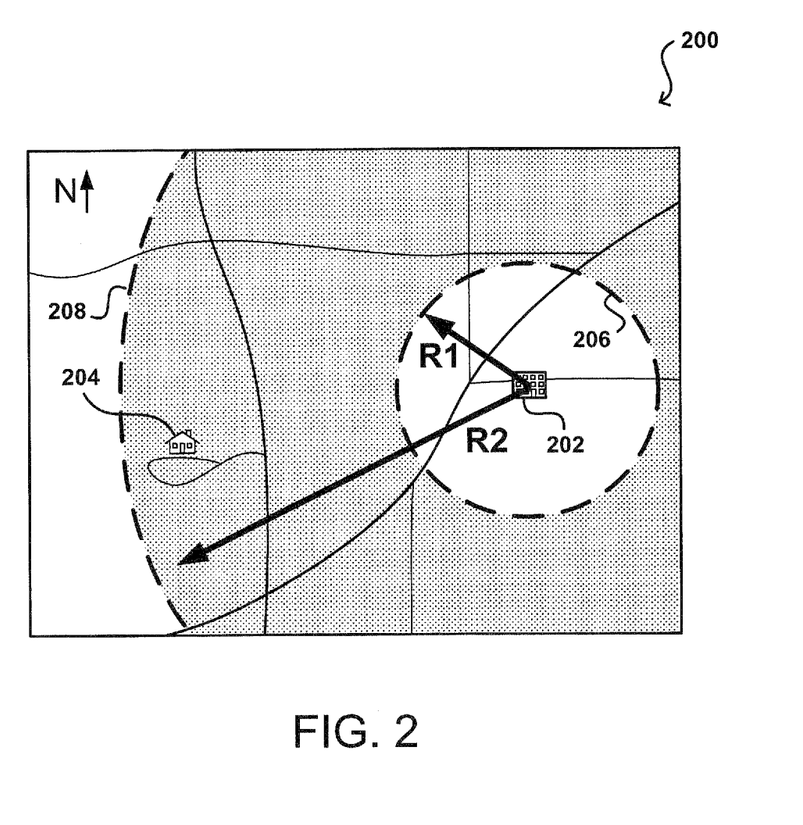
FIG. 2 illustrates an example of distances that can be used to determine when to deliver notifications to a user in accordance with various embodiments.

For example, FIG. 2 illustrates an example map view 200 showing a distance-based notification approach that can be used in accordance with various embodiments. In this example, a user might be an employee, owner, or other person associated with a business or other such entity. The user might have various tasks that need to be performed at a specific location, such as a building 202, warehouse, or other facility where that user works. In at least some embodiments, the user is able to specify a coordinate, address, or other such location associated with that building. The user is also able to specify a radius, here R1, indicating a distance from that location where the user is willing to automatically receive notifications. As seen, the radius R1 around the building defines a circular region 206 with the building at or near the center of the region. When the user is within that automatic notification region 206, the user can configure an alert delivery system, computing device, or other such component to automatically deliver notifications to the user. In one example, the building 202 might be a warehouse from which a merchant ships items that are ordered by various customers. If the user is in charge of shipping the items, the user might want to be notified right away if the user is within the specified distance (e.g., R1) of the building, such that the user can cause the items to be shipped.

In this example approach, the user might not want to be automatically notified when the user is outside the automatic notification region 206. For example, the user might not want to be notified if the user is more than five miles from the building, as the user might be at lunch, running an errand, or otherwise performing an action away from that location. In some cases, the user can be notified when the user enters the automatic notification region, such as when the user is on his or her way to work, such that the user can receive all the notifications before the user arrives at the facility. When the user is outside the automatic notification region, however, the user might not want to receive the notifications except under certain circumstances. For example, the user might be at home 204 or otherwise far enough away from the building 202 such that the user cannot easily or quickly get to the building, and would prefer to instead be notified when the user is within the specified radius. In this example, the user's home 204 is outside the automatic notification region 206 such that the user will not automatically receive notifications at home.

In this example, the user can also define a second radius, here R2, beyond which notifications might be handled differently. For example, the user might specify a radius such as 100 miles where, when an event occurs, the user might want an action to be taken because the user will not be able to get to the building 202 in a reasonable amount of time. The second radius R2 thus defines a second circular region 208, referred to herein as the notification management region, wherein a user within the alert management region but outside the notification region 206 can have alerts delivered according to specified criteria. When a user is outside the notification management region 208, however, another appropriate delivery action can occur. For example, the notification or alert might be delivered immediately, such that the user can cause an action to be taken by another person as soon as possible. In other embodiments, the alert or notification might be delivered to another person or device when the user is outside the notification management region 208.

In at least some embodiments, the location of the user can be determined through the location of an electronic device associated with the user. For example, the user might have a smart phone or tablet computer on which the user receives notifications for a business or other such entity, and which the user typically carries with him or her at most times. The device might have a global positioning system (GPS) or cellular triangulation mechanism, for example, that enables the location of the device to be determined. Based at least in part upon this determination, the notifications or alerts can be delivered according to the specified criteria.

It should be understood that while a radius is used in the above example, other approaches to defining regions can be used as well within the scope of the various embodiments. For example, a user might define a city, region, or other such area as a notification region. Similarly, the user might use rectangular or other shapes to define various regions. Further, the user might specify specific boundaries of any appropriate shape to use in determining how notifications are to be handled. In at least some embodiments, a user can specify multiple locations that each might have different notification regions. For example, a user might be associated with a company that has multiple shipping facilities or warehouses, and might set each of those as a notification position with respective radii or notification regions around each notification position. In some embodiments where a user specifies a first facility and a second facility each with an associated notification region, the user might configure the system to deliver alerts for the first facility when the user is within the notification region for the first facility, and deliver alerts for the second facility when the user is within the notification for the second facility, but not otherwise. Various other approaches can be used as well within the scope of the various embodiments.

As mentioned, however, determining whether to deliver notifications based only on location can be at least somewhat undesirable in certain situations. For example, a user might be home sick for several days and, as a result, might not receive notifications of actions that need to occur. Such a result can be undesirable, as actions might be delayed longer than they should otherwise be delayed, which can result in many undesirable actions, such as canceled orders, angry customers or employers, etc. There might be any of a number or reasons why a user might be outside the notification region 206 longer than a desired amount of time, such that it can be desirable to also include various time-based criteria to be used in deciding when and how to deliver messages or alerts to a user.

In one example, a user might select a criterion whereby an alert or notification is delivered if the user is not within the automatic notification region 206 but the alert or notification has been pending for a specified period of time, such as 24 hours. In some cases, more complex rules can be used to manage alert delivery. For example, the user might want messages to be pending for no more than one business day, such that the 24 hour period only counts hours on weekdays or non-holidays. Using such a rule, the user might never receive notifications on Saturday or Sunday. Further, the user might specify a rule that, even where 24 hours of business days have passed, a notification is not received before 7:00 in the morning, or another appropriate time that is convenient for the user (i.e., will not wake up the user, disturb breakfast, etc.).

Figure 3:
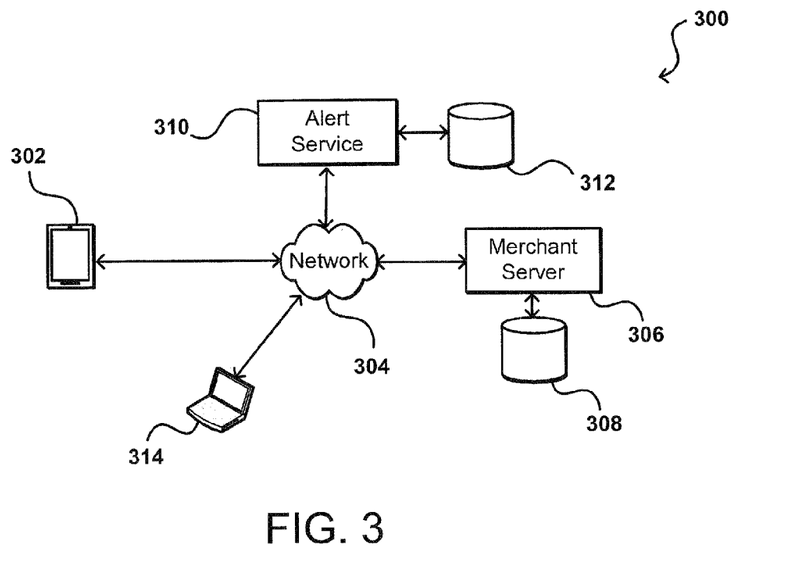
FIG. 3 illustrates an example system for delivering notifications to one or more users that can be utilized in accordance with various embodiments.

FIG. 3 illustrates an example system 300 for delivering notifications to a user that can be utilized in accordance with various embodiments. It should be understood that a business sending notifications of actions to an owner or employee is merely an example, and that various other reasons for sending notifications from other types of entity can take advantage of processes and approaches discussed herein. In this example, the user is a merchant (or employee of a merchant, etc.)

associated with an electronic marketplace, catalog business, or other such entity. The merchant has at least one merchant server 306 or computing device that is able to receive requests, such as may relate to orders, price adjustments, inventory fluctuations, and other such information, and process those requests on behalf of the merchant. The merchant server can access data stored in at least one merchant data store 308, as may include sales data, product information, account information, customer data, or any other appropriate information.

If the merchant server 308 receives information indicating that a customer has purchased one or more items as part of a transaction, for example, the merchant server might include software to cause a notification of the sale to be sent to an appropriate party, such as the user in this example. In this example, the merchant server can generate an appropriate message or notification, determine the appropriate person, device, or address to which to send the notification, and then cause the notification to be sent across at least one network 304 (e.g., the Internet or a cellular network) to a computing device 302 associated with the appropriate user. In this example, the merchant server 306 might work with an alert service 310, or other such entity, in order to manage delivery of the notification. The alert service can be associated with the entity or a third party. For example, the merchant system might register a sale and determine that a notification should be sent to an appropriate person to handle an action for the sale, such as to prepare the items for shipping. The merchant server, however, might not include logic for determining when or where to send the notifications, or the merchant might subscribe to a service to manage the notifications on behalf of the merchant. It should be understood, however, that the merchant server or other component of the merchant can manage the notifications in other embodiments.

In such an example, the merchant server 306 might generate and send a request across the network 304 to the alert service 310. The alert service can determine the appropriate person and/or device to contact in response to the request, as well as any time, distance, or other pertinent information to be used in sending the notification. In one example, the alert service might perform a lookup against an alert data store 312 to determine the appropriate parameters for that merchant at the current time. The alert service can then determine the appropriate device, user, or address to receive the notification, and can cause an appropriate notification to be sent across the same or at least one different network 304 to the computing device 302 for the user, or as discussed later herein to an electronic device 314 for a different user based at least in part upon time and location information.

The alert service 310 can handle delivery of notifications in various ways, as may be configurable by the user. For example, using a first approach the alert service can poll the computing device 302 for location information, or receive location updates from the device, and deliver notifications to the device at an appropriate time and location. In such an approach, the messages are stored by the device until such time as the user is to be notified. In another approach, the alert service can deliver the notifications to the computing device 302 as the notifications are generated, and logic on the computing device can determine when to deliver the notifications to the user. Such an approach can require the computing device to temporarily store the notifications until the user is to be notified, but can deliver the notifications based on the determined position of the device without having to have an available network connection to the alert service 310 or repeatedly send position information for the device. A potential downside of delivering without having a network connection, however, is that the alert service might not know whether the notification was delivered, as confirmation might not be able to be received from the computing device, such that the alert service might send a duplicate message to another user if no confirmation has been received for an allowable period of time. For example, if the computing device 302 for the user does not indicate to the alert service 310 within 24 hours that the notification was delivered to the user, the alert service might be configured to automatically send another copy of the notification to the electronic device 314 of another user to attempt to have the notification handled and confirmed in a timely fashion.

Figure 4:
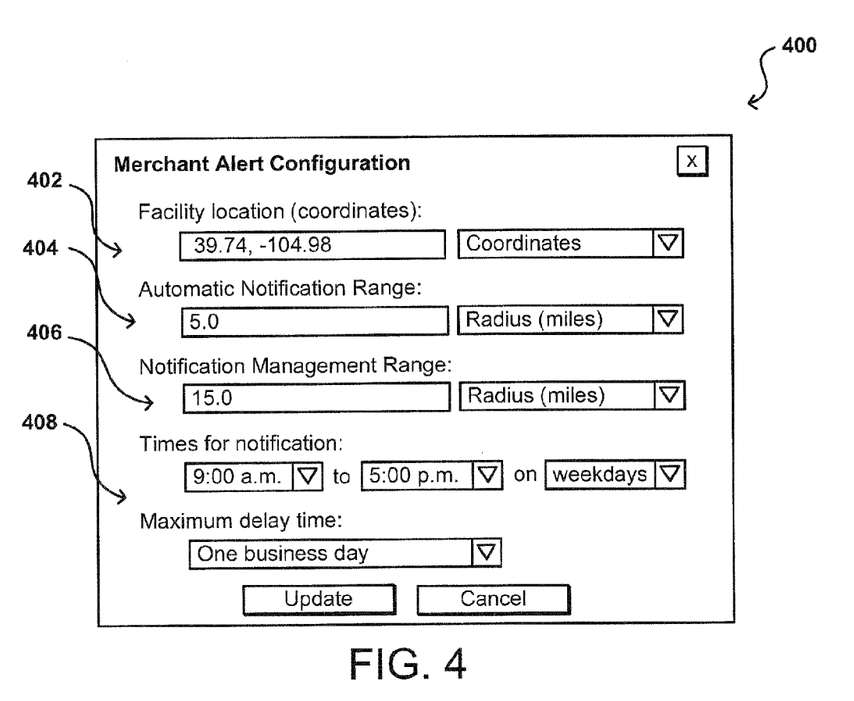
FIG. 4 illustrates an example interface that can be used to specify notification criteria in accordance with various embodiments.

As discussed, a user can configure the times and locations at which notifications are to be delivered to the user. For example, FIG. 4 illustrates an example interface 400 wherein a user can specify various criteria for managing message delivery in accordance with at least one embodiment. In this example, the user is able to specify a location 402 to be used for notification management. As discussed, this can include address or coordinate information for a business or facility at which actions for the notifications will be taken. The user can also specify one or more ranges to be used in managing notification delivery. In this example, the user can specify a first automatic notification range 404 wherein notifications are automatically delivered to the user when the user is within the specified distance of the location 402. The user can also specify a notification management range 406 wherein the notifications should be managed per user specified criteria when the user is within the notification management range but outside the automatic notification range. In at least some embodiments, various actions can be taken when the user is outside the notification management range. For example, the notification might be delivered directly to the user, or the notification might instead be sent to a different user. Various other actions can be taken as well as should be apparent in light of the present disclosure.

The user can also specify various timing information 408 for use with the range information in determining when to deliver notifications to the user. For example, the user can specify a maximum time delay before the notification is delivered to the user or another user is selected. In this example, the user has specified a maximum delay time of one business day. If the user has not been notified within 24 hours (on business days) of the notification being generated, then the notification can be automatically delivered to the user. In some embodiments, the message might be instead sent to another user with a similar or reduced delay time before the notification should be handled. In at least some embodiments, the notification can be sent to different users until the notification is acknowledged. Each subsequent sending might have a reduced delay, at least with respect to the initial delay, to attempt to have the action handled in a timely manner.

The user in this example can also specify the hours for notification delivery. For example, in some embodiments the user might only be notified during the specified hours even if the user is within the automatic notification range during other hours. Further, a notification might only be delivered to a user outside the automatic notification range during those hours even when the notification period has exceeded the specified maximum delay. Various other combinations or uses can be specified and/or configurable by the user in various embodiments.

Figure 5A:
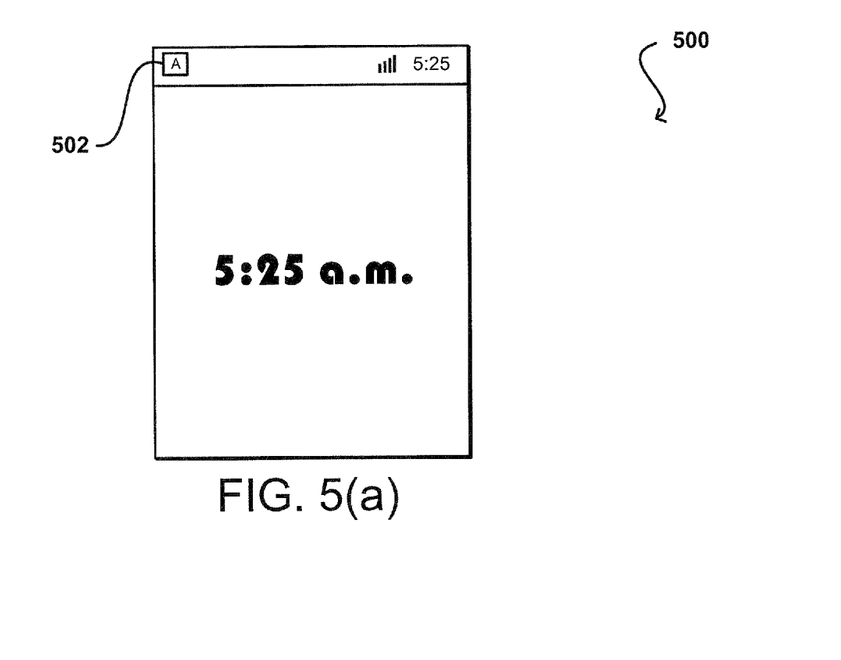
FIGS. 5(a) and 5(b) illustrate example interface states that can be presented to a user in accordance with various embodiments.
Figure 5B:
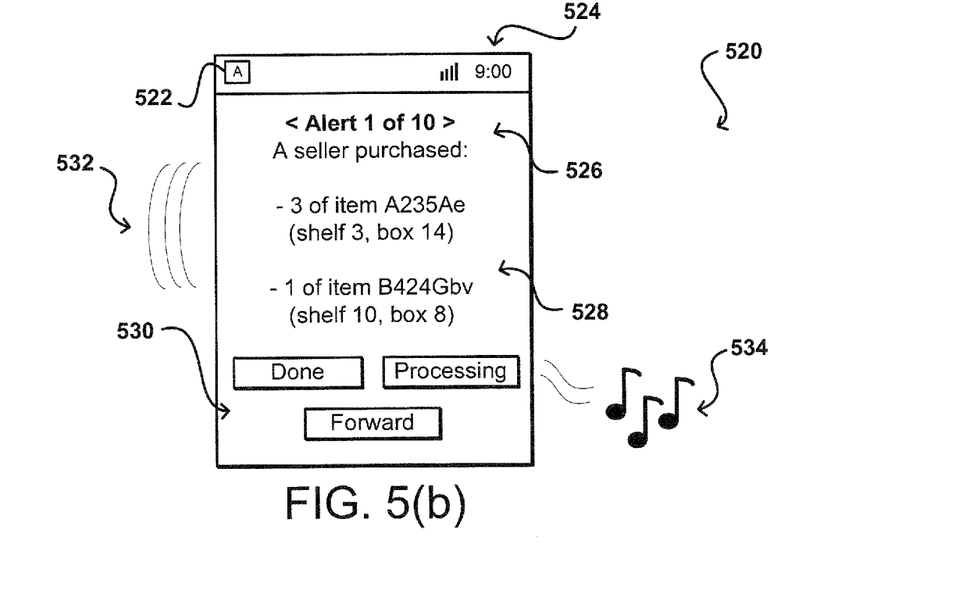

FIGS. 5(*a*) and 5(*b*) illustrate example notifications that might be sent to a user at different times and/or locations within the scope of the various embodiments. For example, a user might specify different types of alerts to receive at different times. A user might not want any indication of an alert or notification when the user is outside the automatic notification range and the maximum delay period has not yet passed. In other embodiments, such as in the state of the interface 500 of FIG. 5(*a*), the device might display via the interface a small icon 502 or other indicia that there is at least one notification pending, but not flash a light, play a sound, or illuminate the display to ensure that the user sees the notification. Such an approach can take advantage of technology used on mobile devices, for example, where a device can subscribe to receive notifications and provide indicators to a user.

In FIG. 5(*b*), the time and/or location of the user has caused a notification to be presented to the user through the interface 520. In this example, the interface is shown to be able to provide any of multiple types of alerts or notifications. For example, an icon 522 such as that discussed previously can be displayed when there is at least one pending notification that has not been viewed, acknowledged, and/or acted on. In another example, an audible notification 534 can be played by the device, such as may include an audio sample or snippet associated with the relevant type of alert. Other notifications are possible as well, such as vibrations 532 when the device is in a silent mode or otherwise configured to provide relatively silent or discrete notifications.

In at least some embodiments, a message 528 or other such information can be automatically displayed on a display element of the computing device as a type of interaction. In other embodiments, the message might only be displayed when the user accesses the device in response to a notification or other such action. The message can include any appropriate information, such as the number of pending notifications 526 and an ability to scroll or navigate through the notifications. For each notification, the message can include pertinent information, such as the items included in a purchase, the location where those items can be found, a change in sales price or stock level, a pending delivery, or other such information. The message or interface can also include multiple user-selectable options 530 or elements, enabling the user to act on the notification. For example, the user can acknowledge that the notification was received, indicate that an action was completed, or request to forward the message to another user to handle. Various other options can exist as well as should be apparent in light of the present disclosure.

Also as can be seen in FIGS. 5(*a*) and 5(*b*), the notification was not presented to the user in FIG. 5(*a*) when the time was 5:25 in the morning and was before a deliverable notification time. In FIG. 5(*b*), where the time 524 has just reached the allowable delivery time of 9:00 a.m., the notification can be delivered to the user (assuming location or other criteria have been met as well).

Figure 6:
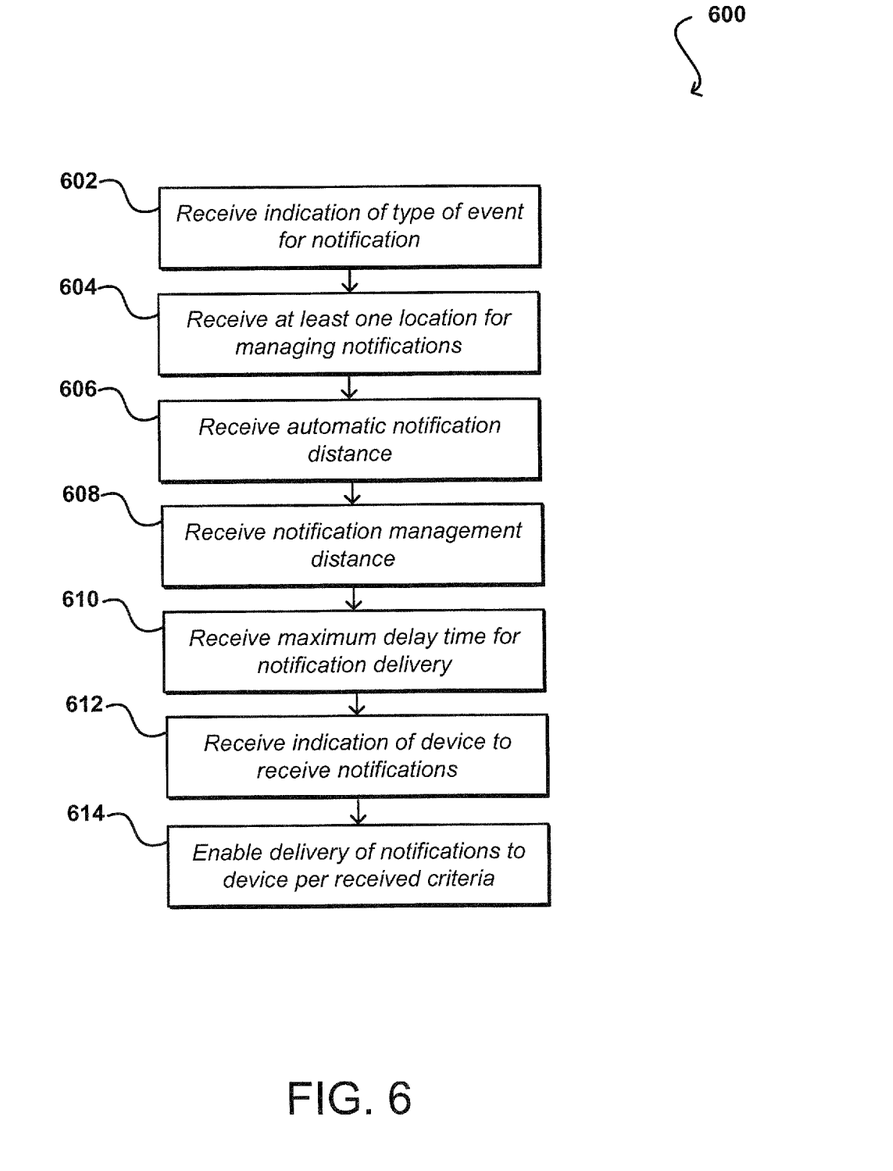
FIG. 6 illustrates an example process for establishing notification delivery criteria that can be used in accordance with various embodiments.

FIG. 6 illustrates an example process 600 for establishing notification delivery criteria that can be used in accordance with various embodiments. It should be understood that, for any process discussed herein, there can be additional, fewer, or alternative steps performed in similar or alternative orders, or in parallel, within the scope of the various embodiments unless otherwise stated. In this example, information indicating a type of event or action for which a notification is to be generated is received 602 from a user. In the context of a merchant, for example, the event could be the purchasing of an item or any other such action discussed or suggested elsewhere herein. In some embodiments, the user can also customize the type or amount of information to be included in the notification for that type of event. At least one location to use in determining when to deliver notifications of that type can also be received 604. As discussed, this can be any appropriate location, such as a location of an office, town, warehouse, home office, or other such location. An automatic notification distance can be received 606, which can be based on the provided location(s), wherein the user can be notified automatically upon the occurrence of an event of the specified type. Also received 608 can be a notification management distance from the provided location(s) where the delivery further depends at least in part upon timing information or other such criteria.

As one such criterion, a maximum delay time for notification delivery can be received 610. As discussed, the user might not want to be disturbed when away from work or another such location, but might need to be notified within a certain amount of time of the occurrence of an event to make sure that any necessary actions for the event are handled. In one embodiment, the user can setup a maximum time delay such as eight hours, twelve hours, twenty-four hours, one business day, or another such period of time. The user can also set up other delivery criteria as well, such as hours during which messages may (or may not) be delivered, backup options if the user cannot be notified, and other such information. Information specifying at least one device or address to which the notification information should be sent can also be received 612. In some embodiments, a failure of a user to acknowledge a notification within a certain amount of time from a first device can cause a copy of the notification to be sent to a second device associated with the user (or another user), etc. Once this and any other information are provided to the notification system, the delivery of notifications to the device can be enabled 614 according to the specified delivery criteria. In at least some embodiments, the criteria specified by the user must comply with any business policies, rules, or limitations specified by a merchant, employer, or other such entity with which the user is associated.

Figure 7:
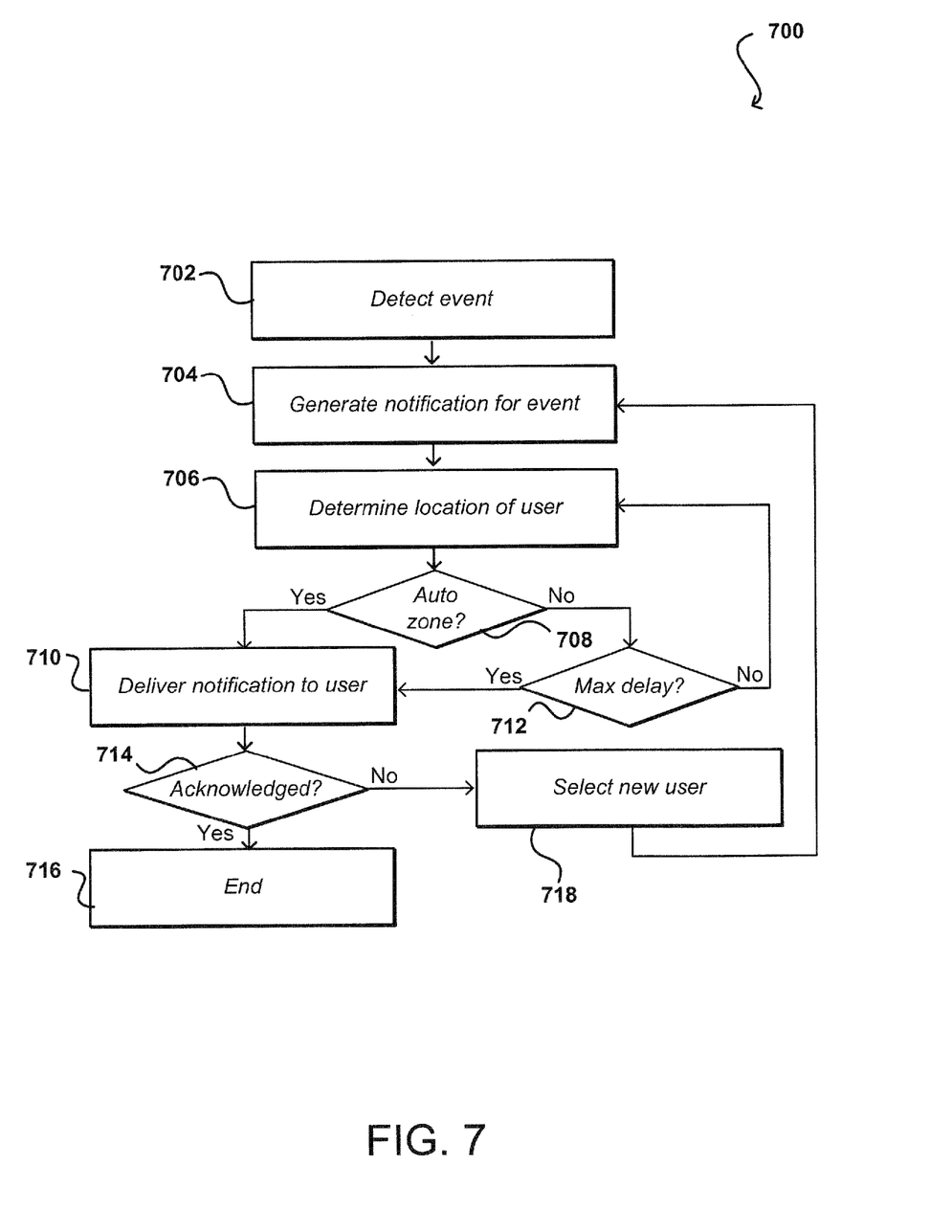
FIG. 7 illustrates an example process for delivering notifications that can be used in accordance with various embodiments.

FIG. 7 illustrates an example process 700 for delivering notifications according to criteria such as those specified above with respect to FIG. 6. In this example, a system or device detects 702 an event for which a notification is to be generated. In response, the system can generate 704 a notification that is to be delivered to the user. The location of the device can be determined 706, and if a device associated with the user and selected to receive the notification is determined 708 to be within the automatic delivery range, the notification can be delivered 710 to the user at the associated device. As discussed, this can involve sending the notification to the device to be presented when the system determines the device is within the automatic delivery range, or can involve presenting the notification to the user where the notification was previously sent but stored on the device until the appropriate delivery criteria were met. In some embodiments, the notification delivery will be held for a period of time, such as five minutes, when a user enters the automatic delivery range to make sure that the user is staying in the range and not tangentially passing through the area. Various other delivery options can be utilized as well as should be apparent from the present disclosure, and any or all of these options can be user configurable in various embodiments.

If the device is not within the automatic delivery range, a determination can be made 712 as to whether a maximum delay time has been reached. If so, the notification can be caused to be delivered 710 to the user via the associated device. If the maximum delay has not been reached, the system (or device) can continue to determine the location of the device until the device is within the automatic delivery range or the maximum delay time has been reached (or another such delivery criterion is met).

Once the notification is delivered to the user, the system can wait for at least a determined amount of time to monitor whether an acknowledgement is received 714 from the user or the associated device. If an acknowledgement is received, the process can end 716 or another process can take over, etc. If the notification is not acknowledged within a determined amount of time, a new user can be selected 718 and a notification generated 704 to be delivered to that user. As discussed, a smaller delay time might be set for the new user to attempt to have the event handled in a more timely fashion. In at least sonic embodiments, new users will be selected until one of the users acknowledges the notification or the event is otherwise handled.

In cases where other users can be notified after a delay, those users can be selected using any appropriate criteria. For example, there might be an ordered list of users and the next user on the list is selected. In other embodiments, the next user might be selected based on a current location of that user. For example, if there is a user within the automatic delivery range then the notification might be sent to that user, or the next nearest user, etc. In some embodiments, the backup users might rotate such that if users have to go out of their way to handle orders or events then the tasks are shared relatively evenly among the identified users. Various other selection approaches can be used as well as should be apparent in light of the teachings and suggestions contained herein.

As mentioned above, there can be different types or classes of notifications sent in response to different types of events. For at least some of these classes, the user (or another authorized entity) can configure different rules or approaches to performing various tasks. One example of these rules is the forwarding of messages to other users when a user is not notified within a maximum period of time. For a notification of an event such as an "out of stock" event, which might be viewed as a "high priority" event, the user might configure a rule to attempt to locate another user as quickly as possible who can handle the notification. For an event such as a sale, which might be viewed as a "medium priority" event, the user might set up rules to deliver the notification to the user after the delay period, go through an ordered list of other users, or handle the message in some other specified way. As mentioned, each classification can also have other aspects specified as well, such as different notification regions, time delay periods, and other such aspects. Each of these aspects may be configurable or updatable by a user or other authorized entity.

In some embodiments, a user might have an application installed on a mobile device that manages the notifications for the user. The notifications might be delivered to the mobile device as the events occur, but the application can monitor location and time information, and can determine when the notifications will be most useful, of most interest, or least distracting to the user. For example, a user might get notifications almost immediately if a user is on site. If that user steps away, such as to run an errand or go to lunch, the notifications might be queued until such time as the user is back on site or meets another such delivery criterion. Similarly, if the user is far enough away (e.g., on vacation) such that the user will not be able to get on site in a reasonable amount of time, the notification might be presented automatically for the user to redirect to another person, or another appropriate action can be taken.

In at least some embodiments, the application on the device does not have to be open and running, but can register for certain events or alerts that can be received by the mobile device. When the user accesses the application or notification, the device can send an acknowledgement or other such indication back to the sending server (or service) such that the server can determine that the notification was delivered. If the acknowledgement is not received within a determined amount of time, the server in some embodiments can request a status update from the device to determine whether the device is working and electronically connected to the server, in order to attempt to determine how to handle the event, such as whether to send the notification to a different device of the same user or to a device of a different user, etc. In some embodiments, the user can open the application to view activity, including a number of pending notifications, without actually taking delivery of those notifications. The application can also enable a user to perform various other actions with respect to the notifications, such as to view the notifications, forward the notifications to other users, reject the notifications, etc.

Various approaches can be used to forward notifications to other users. For example, if the notifications are sent by a server when a device meets a delivery criterion, much of the logic can reside on the server and the server can handle sending notifications to other devices. If the notifications are sent to user devices and wait for delivery, in at least some embodiments the user device can be in charge of forwarding the notification to the next user device if a delivery criterion is not met, the user does not acknowledge a notification, etc. Such an approach can take more of a peer-to-peer approach, where the notification is passed among devices until the notification is acknowledged and a message is sent to the originating server that the notification has been delivered. In some embodiments, the server could send the notification in parallel to multiple devices, with different delivery windows, such that if the user of a first device does not acknowledge the notification within a first period of time a second device can attempt to notify a second user without having to communicate again with the server. Various other delivery approaches can be used as well within the scope of the various embodiments.

Various other approaches to determining location can be used as well. For example, a device might connect with a base station or network of a facility, which can enable a system to determine that the user is onsite for purposes of notification delivery. Similarly, the device might include an RFID tag or other such mechanism that can be detected when the user enters a facility. Various biometric approaches such as facial recognition can also be used to determine when a user is onsite and notifications should be automatically delivered or other such actions taken.

Figure 8:
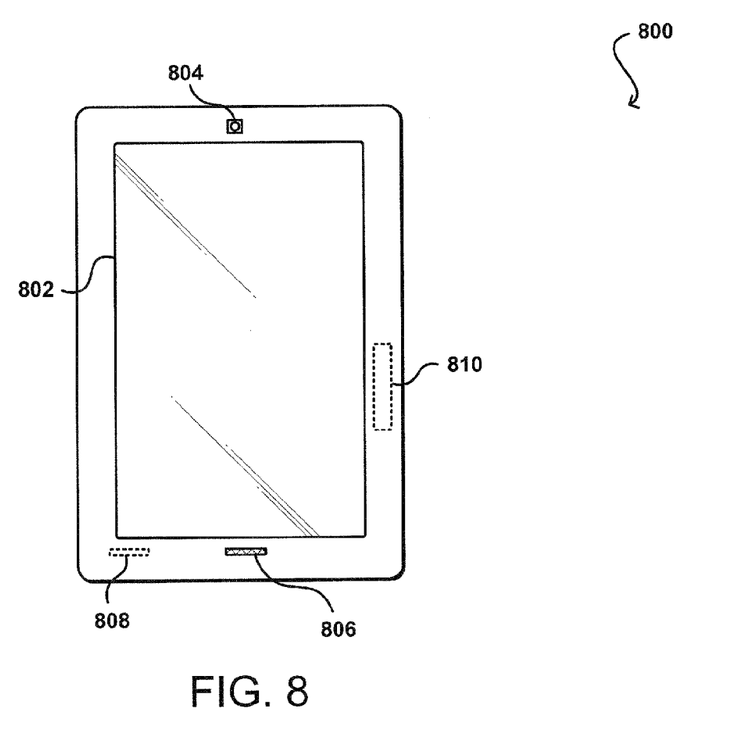
FIG. 8 illustrates an example computing device including elements operable to capture gaze information that can be used in accordance with various embodiments.

FIG. 8 illustrates an example of a computing device 800 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 800 has a display screen 802, which under normal operation will display information to a user facing the display screen (e.g., on the same side of the computing device as the display screen). The computing device in this example can include one or more image capture elements 804 for use in determining, for example, whether the user is near the device for location determination purposes. Each image capture element may be, for example, a camera, a charge-coupled device (CCD), a motion detection sensor, or an infrared sensor, or can utilize any other appropriate image capturing technology. The computing device can also include at least one microphone 806 or other audio capture element(s) capable of capturing audio spoken by the user, such as for user authentication or command input. At least one location-deter mining element 808, such as a GPS element, can be used to determine location information for the device. At least one communications mechanism 810, such as a cellular transceiver or Wi-Fi communications component, can be used to transmit the location and other such information to a notification management service or other such entity. Various other types of input can be utilized as well as known in the art for use with such devices.

Figure 9:
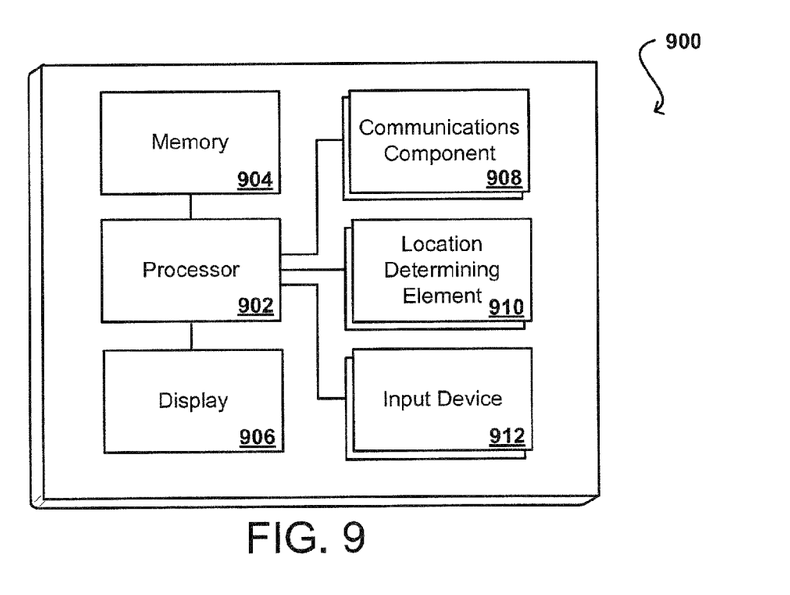
FIG. 9 illustrates example components of a computing device such as that illustrated in FIG. 8.

FIG. 9 illustrates a set of basic components of a computing device 900 such as the device 800 described with respect to FIG. 8. In this example, the device includes at least one processor 902 for executing instructions that can be stored in a memory device or element 904. As would be apparent to one of ordinary skill in the art, the device can include many types of memory, data storage or computer-readable media, such as a first data storage for program instructions for execution by the processor 902, the same or separate storage can be used for images or data, a removable memory can be available for sharing information with other devices, and any number of communication approaches can be available for sharing with other devices. The device typically will include some type of display element 906, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one communications component 908 operable to transmit information over at least one network. The communications component can be any component capable of transmitting and receiving data over a wired or wireless data network.

The device can include at least one location determining element 910, such as a global positioning system or cellular component operable to determine or receive triangulation information or otherwise determine device location. The device can include at least one additional input device 912 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 10:
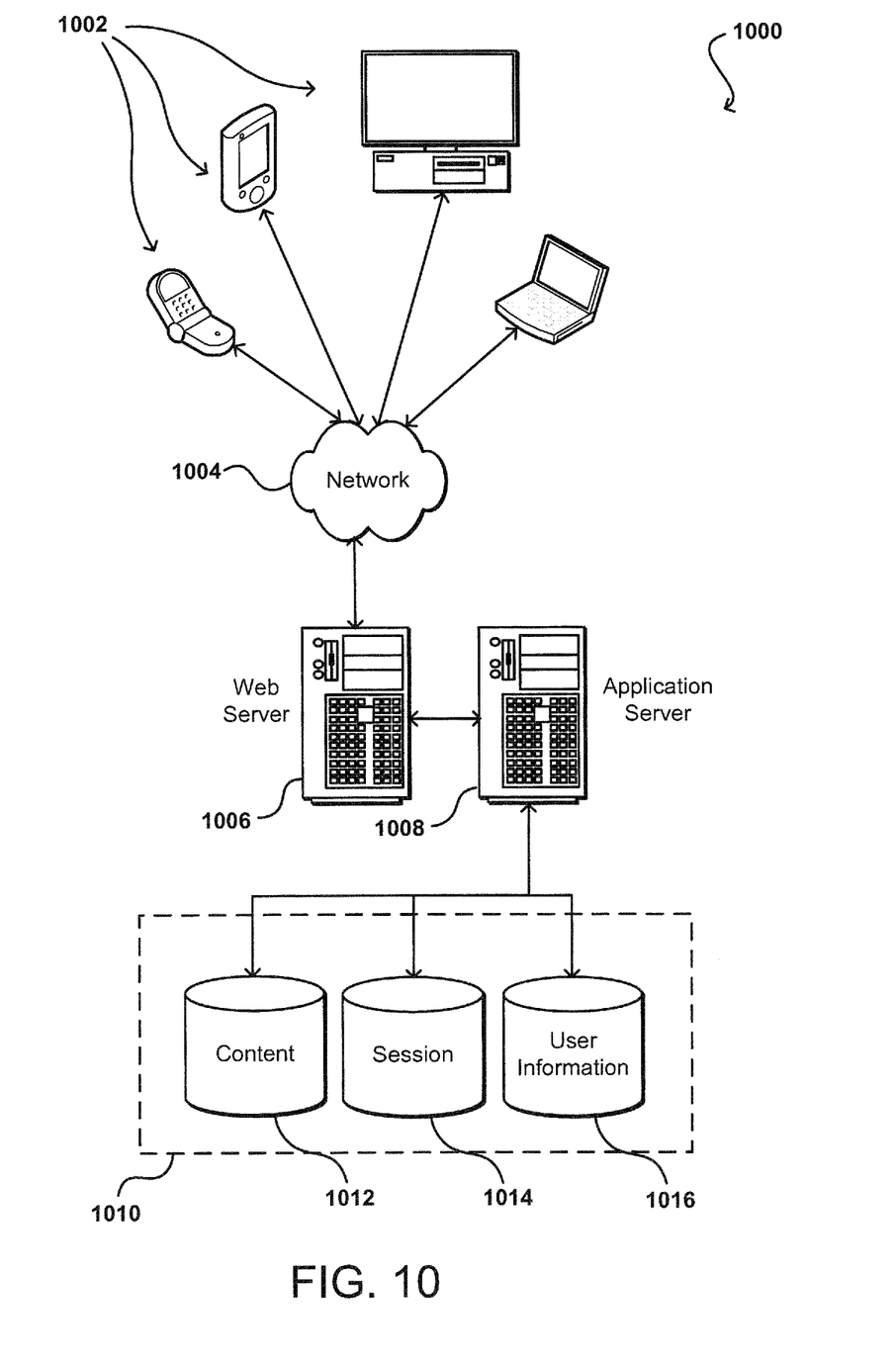
FIG. 10 illustrates an environment in which various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
 a processor;
 a memory device including instructions operable to be executed by the processor to perform a set of actions, enabling the computing device to:
 detect an event associated with a type of notification for a user of a first electronic device;

generate, based on the event detected, a notification of the type of notification for the user of the first electronic device;

determine whether the first electronic device is located between a first specified distance and a second specified distance of a notification location;

upon determining that the first electronic device is located between the first specified distance and the second specified distance of the notification location, deliver the notification to the first electronic device; and upon determining that the first electronic device is not located between the first specified distance and the second specified distance of the notification location, cause the notification to be stored for a specified amount of time, and determine, upon expiration of the specified amount of time, location of the first electronic device and at least one second electronic device, and cause the notification to be delivered to one of the first electronic device or the at least one second electronic device based on the location of the first electronic device, the location of the at least one second electronic device, and the type of the notification generated.

2. The computing device of claim 1, wherein the instructions when executed further cause the computing device to:
enable a user of the first electronic device to specify at least one of the first specified distance, the second specified distance, or the specified amount of time.

3. The computing device of claim 1, wherein the notification is delivered when the first electronic device is between the first and second specified distances further only during times of day specified by the user for notification delivery.

4. The computing device of claim 1, wherein the instructions when executed further cause the computing device to:
monitor for an acknowledgement of delivery of the notification to the user; and
determine that the acknowledgement is not received after the specified amount of time has passed; and
cause the notification to be sent to a different user.

5. A computer-implemented method of managing notification delivery, comprising:
determining an occurrence of an event for which a user of a first computing device is to be notified, the event being associated with a type of notification;
causing a notification of the type of notification, to be generated for the user of the first computing device, based on the event;
determining whether the first computing device is between a first specified distance and a second specified distance of an event location;
upon determining that the first computing device is located between the first specified distance and the second specified distance of the notification location, deliver the notification to the first electronic device; and
upon determining that the first computing device is not located between the first specified distance and the second specified distance of the notification location, causing the notification to be stored for a specified period of delay; and
determining, upon expiration of the specified amount of time, a location of the first computing device and at least one second computing device, and
causing the notification to be sent to one of the first computing device or the at least one second computing device based on the location of the first computing device, a location of the at least one second computing device, and the type of the notification.

6. The computer-implemented method of claim 5, wherein the notification is presented to the user via the first computing device after the specified period of delay has passed.

7. The computer-implemented method of claim 5, wherein a new user is selected to receive the notification after the specified period of delay has passed and the notification has not been delivered to the user.

8. The computer-implemented method of claim 7, wherein the new user is selected based at least in part upon at least one of a current location of the new user or an ordered list of new users.

9. The computer-implemented method of claim 5, wherein there are multiple event locations, and
wherein the notification is caused to be presented to the user when the user is within the first specified distance of one of the multiple event locations.

10. The computer-implemented method of claim 9, wherein there are different first and second distances for each of the multiple event locations.

11. The computer-implemented method of claim 9, wherein each of the multiple event locations is associated with a different type of notification.

12. The computer-implemented method of claim 5, wherein the event occurs through a system associated with the user, and wherein the notification is generated and caused to be presented to the user by a notification service.

13. The computer-implemented method of claim 5, wherein the user is able to specify a form in which the notification is to be received.

14. The computer-implemented method of claim 5, wherein the user is able to specify at least one time window during which notifications are to be received.

15. The computer-implemented method of claim 14, wherein the notification is caused to be delivered to the user after the specified period of delay has passed and within the specified at least one time window.

16. The computer-implemented method of claim 5, wherein at least one of the first or the second specified distances is defined by a respective radius length from the event location.

17. The computer-implemented method of claim 5, wherein at least one of the first and second specified distances is defined by a geographic boundary.

18. The computer-implemented method of claim 5, wherein the notification is (a) sent to the first computing device to be stored until the notification is caused to be presented to the user or (b) stored on a server until the notification is to be delivered to the user, at which time the notification is delivered to the computing device.

19. The computer-implemented method of claim 5, further comprising:
enabling the user to specify a class of notification for each of a plurality of types of event; and
enabling the user to specify at least one of the first specified distance, the second specified distance, the event location, or the specified period of delay for each class of notification.

20. The computer-implemented method of claim 19, further comprising:
enabling the user to specify a set of rules for processing each class of notification when the notification is unable to be delivered to the user within the specified period of delay.

21. A non-transitory computer-readable storage medium storing instructions for managing notification deliver, the instructions when executing by a processor of a computing device causing the computing device to:

determine an occurrence of an event for which a user of a first computing device is to be notified, the event being associated with a type of notification;

cause a notification of the type of notification, to be generated for the user of the first computing device, based on the event;

determine whether the first computing device is between a first specified distance and a second specified distance of an event location;

upon determining that the first computing device is located between the first specified distance and the second specified distance of the notification location, deliver the notification to the first electronic device; and cause, upon determining that the first computing device is not located between the first specified distance and the second specified distance of the notification location, the notification to be stored until a specified maximum period of delay has passed, and determine, upon expiration of the specified amount of time, a location of the first computing device and at least one second computing device, and cause the notification to be sent to one of the first computing device or the at least one second computing device based on the location of the first computing device, the location of the at least one second computing device, and the type of the notification.

22. The non-transitory computer-readable storage medium of claim 21, wherein the instructions when executed further cause the computing device to:

attempt to deliver the notification to one or more other users if the specified period of delay has passed and no acknowledgement of receipt has been received from the user.

23. The non-transitory computer-readable storage medium of claim 22, wherein the notification is attempted to be delivered to the one or more other users in a selected order among the one or more other users, and wherein a specified delivery time for each of the one or more other users is less than the specified period of delay for the user.

24. The non-transitory computer-readable storage medium of claim 21, wherein the instructions when executed further cause the computing device to:

enable the user to reject the notification or instruct the notification to be delivered to a different user.

25. The computing device of claim 1, wherein the instructions when executed further cause the computing device to:

determine that the electronic device is located within the first specified distance of the notification location; and cause the notification to be delivered to the first electronic device.

26. The computing device of claim 1, wherein the instructions when executed further cause the computing device to:

determine that the computing device is within the first specified distance of the notification location after the specified amount of time; and causing the notification to be sent to the first computing device.

* * * * *